R. H. STEVENS.
BIN GATE.
APPLICATION FILED OCT. 7, 1920.
1,398,047.
Patented Nov. 22, 1921.
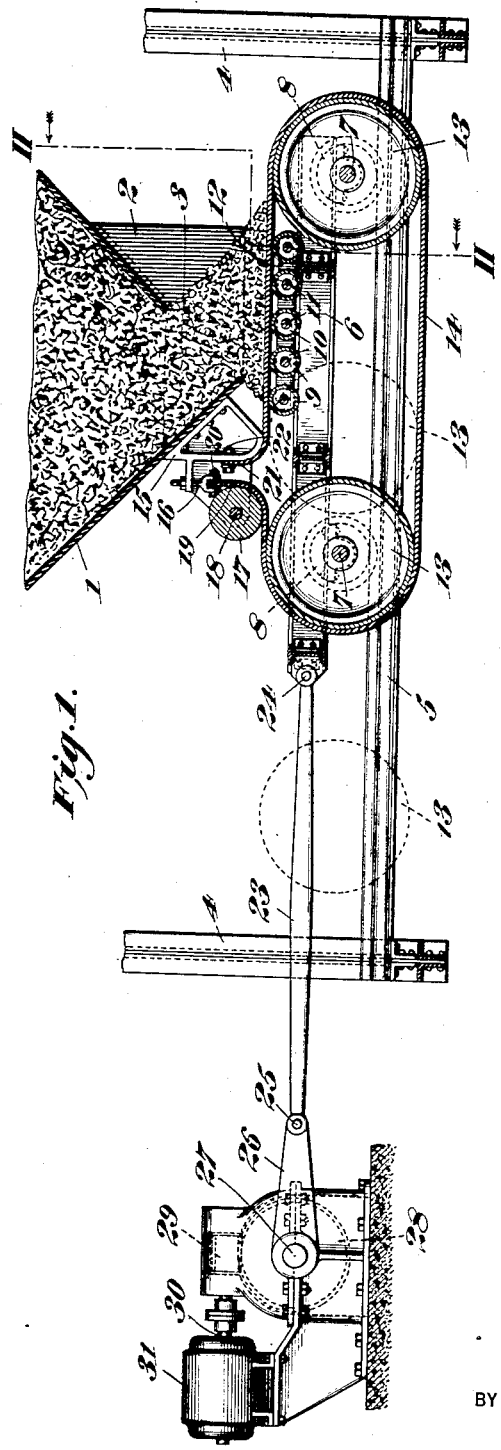
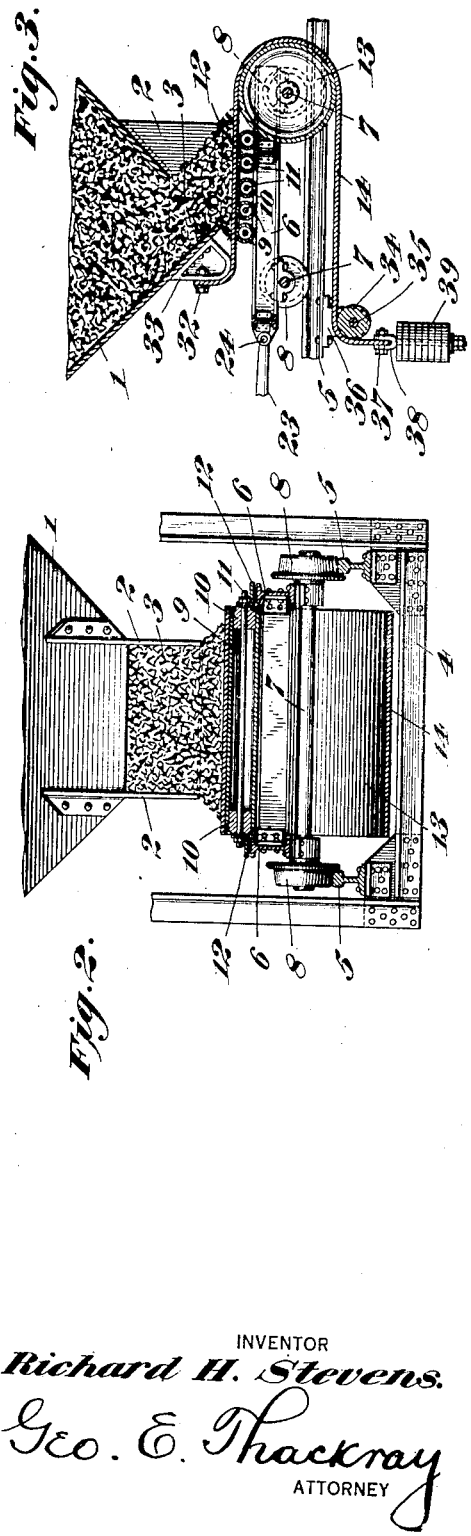
INVENTOR
Richard H. Stevens.
BY
Geo. E. Thackray
ATTORNEY

UNITED STATES PATENT OFFICE.

RICHARD H. STEVENS, OF PHILADELPHIA, PENNSYLVANIA.

BIN-GATE.

1,398,047.   Specification of Letters Patent.   Patented Nov. 22, 1921.

Application filed October 7, 1920. Serial No. 415,353.

*To all whom it may concern:*

Be it known that I, RICHARD H. STEVENS, a citizen of the United States, and a resident of the city of Philadelphia, in the county of Philadelphia and State of Pennsylvania, have invented certain new and useful Improvements in Bin-Gates; and I do hereby declare the following to be a full, clear, and exact description of the invention, such as will enable others skilled in the art to which it appertains to make and use the same.

My invention relates to a bin gate or hopper gate adapted to control or discharge fine or coarse granular materials, etc., from a chute hopper or bin for the purpose of transferring such materials from the chute hopper or bin to cars, wagons, conveyers or otherwise in predetermined or other quantities as may be desired for further use or transportation.

My bin gate is used in connection with a bin or chute hopper construction provided with a discharge opening in the lower or other portion thereof to permit the discharge of such materials, said opening being controlled by my gate. The gate consists generally of a reciprocable truck with wheels, mounted on suitable rails or otherwise and adapted to be moved backward or forward to any extent desired by means of a motor or crank or by any other suitable means. The truck or carriage is provided with a pair of spools, drums or rollers spaced apart, and is provided with motive means such as a pitman, rack, winding rope, etc., and on and over said drums or rollers is mounted a belt, which may be either of leather or rubber belting, duck, a flexible steel band or a plurality of metal plates mounted on a sprocket chain or otherwise, etc. The ends of said flexible member are secured to a fixed portion of the hopper or structure and pass or run around and over the spools, the upper portion of the belt being adapted to form a closure for the bin opening in such a way that when closed the material rests thereon and forms a talus, which ordinarily remains at an inclination corresponding with the natural repose of the material.

When it is desired to discharge any or part of the contents, the carriage may be moved backward to any desired extent, thereby permitting more or less of the material to roll on and over the flexible member on the end of the pulley or spool, and when sufficient material is thus discharged the carriage is moved forward to a closed position, whereupon the discharge of the material is stopped. This arrangement is practically frictionless, as the backward movement of the flexible member draws it away from the superimposed material by a rolling action, and the return of the same to a closed position stops the stream of material without any appreciable frictional effect.

Although not essential to my construction I may provide anti-friction rollers which rest upon the frame of the carriage to support the upper portion of the flexible member in alinement and without flexure or distortion.

Having thus given a general description of my invention, I will now, in order to make the matter more clear, refer to the annexed sheet of drawings, which forms part of this specification and in which like characters refer to like parts.

Figure 1 is a longitudinal sectional elevation through my bin gate, the lower part of the material bin or hopper and the operating mechanism; Fig. 2 is a transverse sectional elevation taken on the line II—II of Fig. 1; and Fig. 3 is a slightly modified form of my invention.

Referring now to the characters of reference on the drawings: The lower portion of the chute hopper or bin is 1, provided with side portions 2, adapted to guide and limit the discharge of the material in such a direction as to maintain it on the flexible member 14 of the gate. 3 is the mouth or opening near the lower end of the bin. 4 indicates the supporting structure for the gate. 5 are the rails on which the gate carriage is adapted to be reciprocated. 6 are the side frames of the carriage illustrated as I-beams, 7 are the carriage axles provided with the wheels 8 mounted thereon adapted to be moved backward and forward on the rails 5. Mounted upon the carriage beams 6 are a plurality of anti-friction rollers 9, which are shown of tubular construction with end portions 10 fitted therein, through which pass the axles 11. The ends of the axles 11 are mounted in openings provided in the angular guides 12, which serve to space the rollers apart and maintain them in parallelism. A small amount of clearance is provided between the angular guides 12 and the top of the carriage beams 6 in order to obviate friction between these two parts. At each end of the carriage frame rollers or pulleys 13 are provided, around which passes the flexible member 14. On the lower or stationary part of the hopper a bracket 15 is secured as illustrated, and to this are adjustably secured the clevis bolts 16, to which one end 19 of the flexible member 14 is fastened, these clevis bolts being provided with nuts as illustrated to adjust and take up unnecessary slack in the flexible member 14 if desired. A guide roller 17 is mounted on the bracket 15 as illustrated and is provided with an axle 18 on which it is adapted to rotate. The flexible member 14 is secured to the clevis bolts 16 by means of the bolts 20. The other end of the flexible member 14 is permanently secured to a portion of the bracket 15 by means of the bolts 22. The flexible member 14 may also be endless and one portion thereof secured to a fixed part of the structure.

The carriage of my gate is adapted to be reciprocated by the pitman 23, which is secured to the carriage by the pivot bolt 24 and to the crank 26 by the pivot bolt 25. The crank 26 is mounted on the worm wheel shaft 27 on which is mounted the worm wheel 28. The worm wheel 28 is adapted to be driven by the worm 29 secured to the motor shaft 30 and adapted to be operated by means of the motor 31, which as illustrated is an electric motor, but may of course be of any other type.

Referring now particularly to the slightly modified form of my invention as illustrated in Fig. 3 of the drawings: This construction only has one pulley, roller or spool 13 around which the forward end of the belt passes, one end of the belt being fixed in a stationary manner to the bracket 33 which is attached to the lower part of the bin or hopper, the belt being secured thereto by means of the bolts 32. The belt or flexible member 14 in this case passes over an idler roller 34 which is mounted upon the shaft 35 which shaft is mounted in the journal brackets 36 in such a way that the roller 34 is adapted to rotate easily in said journals. The other end of the belt or flexible member 14 is provided with a counterweight 39 which is secured thereto by the bolt 37, which bolt passes through the clevis end of the clevis bolt 38 upon which the counterweights 39 are mounted. In this construction the tension of the belt is maintained by means of the counterweight 39 and as the pulley or spool 13 is retracted from the position shown in Fig. 3 or is projected forward the counterweight 39 moves downwardly or upwardly and maintains the tension on the belt to keep it tight and in frictional engagement with the pulley or spool 13 and also to maintain the belt or flexible member stretched in a substantially straight line below the material in the hopper in such a way that it is well adapted to support the same, and this action is further aided by the support given to the belt immediately below the material in the hopper by means of the small rollers 9.

In the construction illustrated in Fig. 3 the movement of projection and retraction of the spool 13 and the consequent movement of the belt or flexible member is accomplished by the action of the pitman 23 which is pivoted at 24, and its movement may be accomplished by means of an apparatus similar to that illustrated in Fig. 1 or otherwise as desired.

The operation of my bin gate is as follows: The parts being in position as illustrated on the drawings, the opening in the lower part of the bin or hopper is closed and the material rests tranquilly upon the flexible member 14, and when it is desired to discharge material the motor is operated in such a way as to retract the carriage to the left to any extent desired and as illustrated in Fig. 1; the extreme position of the carriage wheels is shown by the dotted circles 13. As the carriage is retracted the flexible member 14 turns over and runs on the pulleys or rollers 13 and its forward portion is drawn downwardly from the pile of material in the hopper as the flexible member rolls away and said material is discharged over the right hand portion of the flexible member 14 and pulley or roller 13 in a stream which flows by gravity into a car, conveyer or otherwise. The movement of the carriage may be graduated and it may be stopped in a fixed position to discharge a full stream equal to the capacity of the opening or it may be operated to discharge a smaller stream or any desired quantity of material that may be required in a given time, and when desired to be closed the reverse movement of the carriage stops the flow in a gradual and substantially frictionless and rolling manner.

Another advantage of my apparatus is that it requires very little power to operate, being frictionless, and on account of this construction there is very little wear upon the various portions.

Having thus described my invention, what I claim and desire to secure by Letters Patent is:—

1. The combination with a hopper provided with an opening therein, of a closure therefor, comprising a member adapted to operate by rolling contact against the material therein.

2. The combination with a hopper provided with an opening therein, of a closure, comprising a flexible member mounted below said opening and adapted to be projected forward to close the same, and retracted therefrom to open the same, a portion of said flexible member being stationary.

3. The combination with a hopper provided with an opening therein, of a closure, comprising a flexible member on a spool mounted below said opening, and adapted to be projected forward to close and retracted therefrom to open the same.

4. The combination with a hopper provided with an opening therein, of a closure therefor comprising a flexible member, having a portion thereof stationarily secured and mounted below said opening on a spool and means for reciprocating said spool below said opening, whereby the flexible member opens and closes said opening and controls the discharge of materials therefrom.

5. The combination with a hopper provided with an opening, of a closure therefor, comprising a flexible member on a pair of spools, and means for reciprocating the same below said opening.

6. The combination with a hopper provided with an opening therein, of a closure comprising a flexible member mounted on spools below said opening and adapted to be projected forward to close the same or retracted therefrom to open the same by rolling contact with the material resting thereon.

7. The combination with a hopper provided with an opening therein, of a closure therefor comprising a flexible member mounted below said opening on a pair of spools spaced apart and having a portion thereof stationarily secured, and means for reciprocating said spools below said opening, whereby the flexible member opens and closes said opening and controls the discharge of material therefrom.

8. The combination with a hopper provided with an opening, of a closure comprising a flexible member on a pair of spools adapted to be reciprocated below said opening and friction rollers supporting said member.

9. The combination with a hopper provided with an opening, of a closure therefor comprising a reciprocable carriage mounted below said opening, a pair of spools or pulleys on said carriage, a flexible member mounted over said spools, the end portions of said member being stationarily secured, and means for reciprocating said carriage.

10. The combination of a hopper provided with an opening, of a closure therefor comprising a reciprocable carriage mounted below said opening, a pair of spools or pulleys on said carriage, a flexible member mounted over said spools, the end portions of said member being stationarily and adjustably secured and means for reciprocating said carriage.

11. A closure for a bin or hopper opening, comprising a flexible member mounted therebelow on a pair of spools or pulleys, a portion of said member being stationary, and means for simultaneously reciprocating said pulleys, whereby the flexible member is retracted from or projected under said opening.

12. A closure for a bin or hopper opening comprising a flexible member mounted therebelow on a pair of spools or pulleys, a portion of said flexible member being stationary, means for simultaneously reciprocating said pulleys whereby the flexible member is retracted from or projected under said opening and movable supporting means between said pulleys for the upper portion of said flexible member.

13. A bin or hopper closure, comprising a pair of pulleys spaced apart, a flexible member passing around said pulleys, a portion of said flexible member being fixed or stationary, and means for reciprocating said pulleys whereby the upper portion of said flexible member is retracted to open and projected to close the bin or hopper opening.

14. A bin or hopper closure comprising a wheeled truck or carriage, a pair of parallel spools spaced apart and revolubly mounted thereon, a flexible member mounted on and over said spools, one portion of said flexible member being fixed, and means for reciprocating said truck whereby the upper portion of said flexible member is withdrawn from to open or projected toward to close the hopper opening.

15. A bin or hopper closure comprising a wheeled truck or carriage, a pair of parallel spools spaced apart and revolubly mounted thereon, a flexible member mounted on and over said spools, one portion of said flexible member being fixed, a plurality of anti-friction rollers rollably mounted on the carriage and adapted to support the upper portion of said flexible member, and means for reciprocating said truck whereby the upper portion of said flexible member is withdrawn from to open or projected toward to close the hopper opening.

16. A hopper or bin closure comprising a wheeled carriage mounted on a track, a pair of parallel spools or pulleys spaced apart and revolubly mounted thereon, a flexible member passing around and over said pulleys, one portion of which is fixed or stationary, a plurality of anti-friction rollers rollably mounted on said carriage and adapted to support the upper portion of said flexible member, and means for rolling said carriage to and from the hopper opening.

In witness whereof I hereunto affix my signature.

RICHARD H. STEVENS.